(12) United States Patent
Altan et al.

(10) Patent No.: US 6,182,015 B1
(45) Date of Patent: Jan. 30, 2001

(54) HIGH FIDELITY ROTATION METHOD AND SYSTEM

(75) Inventors: Suat Altan, Sugarland; Jianchao Li, Houston; Xianhuai Zhu, Sugarland, all of TX (US)

(73) Assignee: PGS Tensor, Inc., Houston, TX (US)

( * ) Notice: Under 35 U.S.C. 154(b), the term of this patent shall be extended for 0 days.

(21) Appl. No.: 09/268,261

(22) Filed: Mar. 15, 1999

(51) Int. Cl.$^7$ ............................................ G01V 1/28
(52) U.S. Cl. ................................ 702/17; 367/75
(58) Field of Search ........................ 702/14, 17, 18; 367/38, 75

(56) References Cited

U.S. PATENT DOCUMENTS

| | | |
|---|---|---|
| 4,706,224 | 11/1987 | Alford . |
| 4,803,666 | 2/1989 | Alford . |
| 4,803,669 | 2/1989 | Airhart . |
| 4,903,244 | 2/1990 | Alford . |
| 4,933,913 | 6/1990 | Thomsen . |
| 5,027,332 | 6/1991 | Alford . |
| 5,029,146 | 7/1991 | Alford . |
| 5,142,501 | 8/1992 | Winterstein . |
| 5,343,441 | 8/1994 | Alford . |
| 5,657,294 | 8/1997 | Zhang . |
| 5,724,307 | 3/1998 | Gaiser . |
| 5,835,452 | 11/1998 | Mueller et al. . |

FOREIGN PATENT DOCUMENTS 0 331 827 A1   3/1988   (EP) .

OTHER PUBLICATIONS

Boulfoul, M., et al., Separation and enhancement of split S–waves on multicomponent shot records from the BIRPS WISPA experiment, Geophysics vol. 59, No. 1 (Jan. 1994) pp. 131–139.

*Primary Examiner*—Donald E. McElheny, Jr.
(74) *Attorney, Agent, or Firm*—Arnold & Associates

(57) ABSTRACT

A method and system for processing first and second seismic traces includes rotating the first seismic traces and the second seismic traces to forty-five degrees in the time domain. In one embodiment, the rotated first time domain traces and second time domain traces are transformed to the frequency domain to obtain an amplitude spectrum for each rotated first time domain trace and an amplitude spectrum for each rotated second time domain trace. Each amplitude spectrum is squared to obtain a power spectrum for each transformed and rotated time domain trace. The phase of each transformed rotated time domain trace to zero. The power spectrum for each transformed rotated time domain trace is then averaged. Each transformed rotated time domain trace is divided into time windows. A power spectrum for each window is obtained for the entire of each transformed rotated time domain trace. The power spectra of each window of the transformed rotated time domain trace is summed to obtain a summed first power spectrum. A third power spectrum representing a source wavelet is defined. The third power spectrum is divided by the power spectrum to obtain a set of frequency domain scalars. The amplitude power spectrum is multiplied by the set of frequency domain scalars. The result of this multiplication is inverse transformed. The amplitudes of the inverse transformed result is compared to derive an first amplitude scalar.

28 Claims, 10 Drawing Sheets

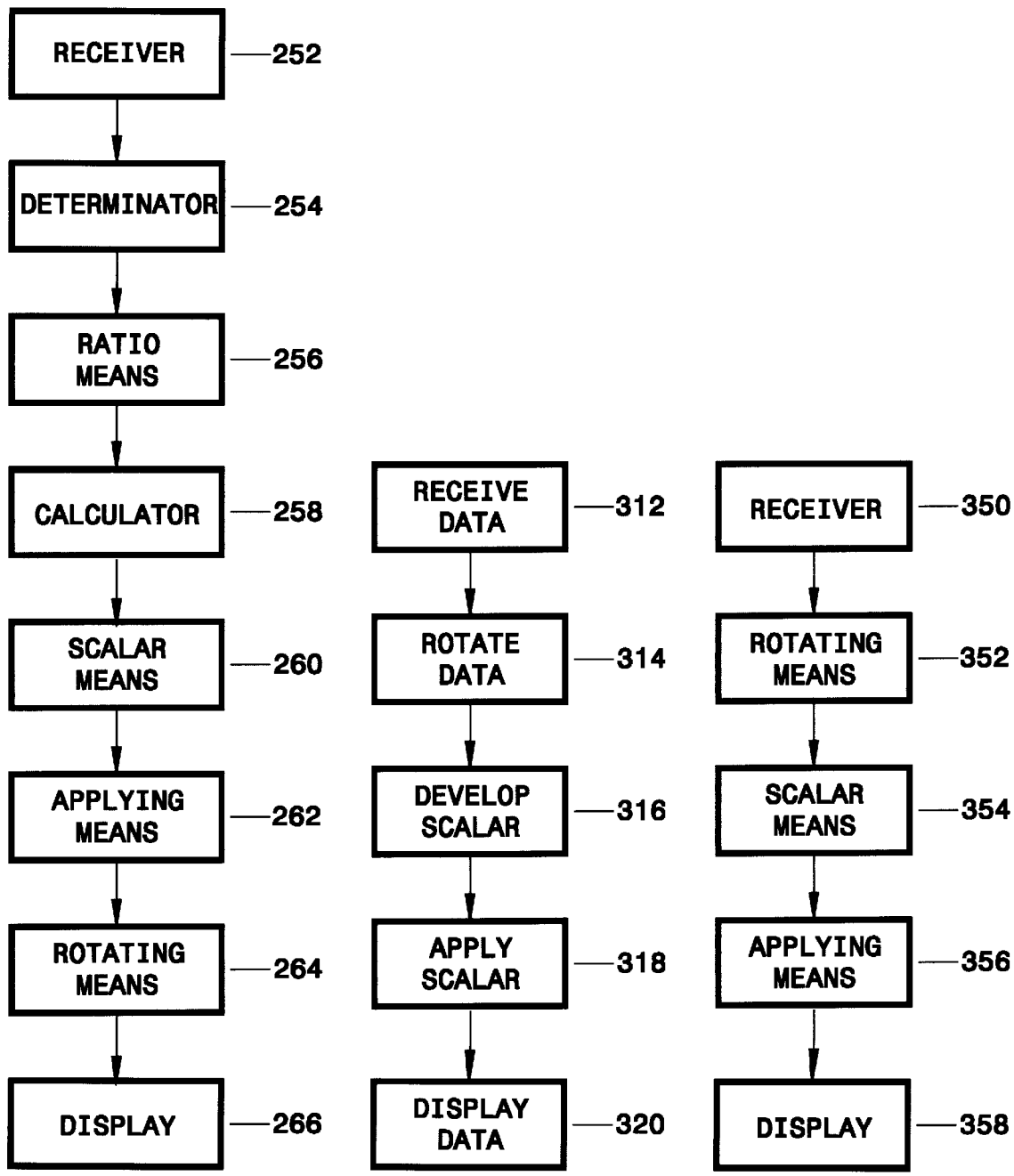

HIGH FIDELITY ROTATION METHOD AND SYSTEM

BACKGROUND OF THE INVENTION

The present invention pertains to seismic data processing and more particularly to processing seismic data obtained from seismic cables set on land or under a body of water where multi-axial geophones are used at each single receiver location. The present invention pertains to changing the orientation of multicomponent seismic detectors and more particularly to the use of data manipulation and the rotation of the orientation of seismic detectors to remove errors and noise from detected data.

Multicomponent detectors are generally composed of three geophones: two orthogonal horizontal geophones and one vertical geophone. There are various problems in the orientation of these multicomponent geophone assemblies. One problem is due to shot position errors, or the location of the shot or source with respect to the detectors. A further problem occurs in marine environment. When the array is laid on the ocean bottom, various ocean floor inconsistencies, such as rocks, coral, etc., can misalign the intended orientation. Still another problem relates to coupling errors between the geophones and the earth.

There have been attempts at dealing with the determination of receiver orientation angle. However, even under these methods, there is still some error. Even if the residual error is on the order of a few degrees, it still needs to be addressed.

An example of prior art efforts to compensate for coupling discrepancies in seismic data acquisition is U.S. Pat. No. 5,724,307, incorporated herein by reference, titled "Method for Improving the Coupling Response of a Water Bottom Seismic Sensor" issued to James E. Gaiser. This reference relates to providing a receiver-consistent deconvolution operator that models the damped oscillatory wavetrain which is related to geophone coupling to the water bottom. The operator described is a best-fitting function that endeavors to describe the difference in coupling response between a well coupled first geophone relative to an imperfectly coupled second geophone. The operator is applied to the second signals to compensate the signals for the distortion due to imperfect second ground coupling.

SUMMARY OF THE INVENTION

The object of the present invention is to address the problems described above. According to one aspect of the invention, therefore, a method is provided for processing first and second seismic traces, each of the traces having a source location and a receiver location associated therewith, the method comprising: rotating the first and second traces to about an a pre-determined angle from a line between the source location and the receiver location associated with the traces; manipulating the traces at about the pre-defined angle, wherein manipulated traces result; and rotating the manipulated traces to a desired orientation.

According to a more specific embodiment, the manipulating comprises: dividing the rotated first traces into time windows; dividing the rotated second traces into time windows; and transforming the rotated and divided first time domain traces and the rotated and divided second time domain traces to the frequency domain to obtain an amplitude spectrum for each time window of the rotated first time domain trace and an amplitude spectrum for each time window of the rotated second time domain trace.

Next, the following steps are performed: squaring each the amplitude spectrum to obtain a power spectrum for each the transformed rotated first time domain trace and for each the transformed rotated second time domain trace time domain trace; averaging the power spectrum for each the transformed rotated first time domain window across a common receiver gather; averaging the power spectrum for each the transformed rotated second time domain window across a common receiver gather; defining a third power spectrum representing a source wavelet, dependant upon the averaging; dividing the third power spectrum by the first power spectrum to obtain a set of first frequency domain scalars; dividing the third power spectrum by the second power spectrum to obtain a set of second frequency domain scalars; and determining the amplitude spectrum of the rotated first and second traces, wherein an first amplitude spectrum results, a second amplitude spectrum results, an first phase spectrum results, and a second phase spectrum results.

The process then continues with: multiplying the first amplitude spectrum by the set of first frequency domain scalars; multiplying the second amplitude spectrum by the set of second frequency domain scalars; inverse transforming the first amplitude spectrum multiplied by the set of first frequency domain scalars using the first phase spectrum; inverse transforming the second amplitude power spectrum multiplied by the set of second frequency domain scalars using the second phase spectrum; comparing amplitudes of the inverse transformed first amplitude spectra multiplied by the set of first frequency domain scalars to derive an first amplitude scalar; and comparing amplitudes of the inverse transformed second amplitude spectra multiplied by the set of second frequency domain scalars to derive a second amplitude scalar.

The process finishes with: matching the amplitude of the entire trace to a predetermined constant with the first amplitude scalar to obtain an amplitude and wavelet matched trace; matching the amplitude of the entire trace to a predetermined constant with the second amplitude scalar to obtain an amplitude and wavelet matched trace; and re-rotating the traces to a desired orientation.

Further, in one even more specific embodiment, the re-rotating step includes: returning the traces to original orientation; and determining wavelet matched traces by inverse transformation. In still a further embodiment, the rotating step includes: returning the traces to original orientation; and determining wavelet matched traces by deconvolution.

According to another aspect of the invention, a further method is provided for processing multicomponent seismic data, wherein the data comprises traces from a first component and a second component, wherein there is a source location and a receiver location associated with each trace, the method comprising: determining an angle between one of the axes of either the first component or the second component; assigning a ratio value to an amplitude relationship between the first and the second components, the value being dependant upon the angle; determining an actual ratio of the amplitudes of the first component and the second component; deriving at least one scalar dependant upon the value and the actual ratio such that multiplication of the at least one scalar and at least one of the traces of first component and the second component causes the ratio of the multiplied trace amplitude and the amplitude of the trace from the other component to match the value; and multiplying the at least one scalar to at least one of the traces of the first component and the second component.

In a more specific example embodiment, the method further comprises rotating the traces.

In still a further aspect of the present invention, a method is provided for processing multicomponent seismic data, wherein the data comprises traces from a first component and a second component, wherein there is a source location and a receiver location associated with each trace, the method comprising: rotating the traces to a predetermined angle between one of the axes of either the first component or the second component; assigning a ratio value to an amplitude relationship between the first and the second components, the value being dependant upon the angle; determining an actual ratio of the amplitudes of the first component and the second component; deriving at least one scalar dependant upon the value and the actual ratio such that multiplication of the at least one scalar and at least one of the traces of first component and the second component causes the ratio of the multiplied trace amplitude and the amplitude of the trace from the other component to match the value; and multiplying the at least one scalar to at least one of the traces of the first component and the second component.

In a more specific example embodiment, the method further comprises rotating the traces to a desired orientation after the multiplying.

According to still a further aspect of the present invention, a system is provided for processing first and second seismic traces, each of the traces having a source location and a receiver location associated therewith, the system comprising: means for rotating the first and second traces to about forty-five degrees from a line between the source location and the receiver location associated with the traces; means for manipulating the traces at about forty-five degrees, wherein manipulated traces result; and means for rotating the manipulated traces to a desired orientation.

According to a more specific example embodiment, the means for manipulating comprises: means for dividing the rotated first traces into time windows; means for dividing the rotated second traces into time windows; means for transforming the rotated and divided first time domain traces and the rotated and divided second time domain traces to the frequency domain to obtain an amplitude spectrum for each time window of the rotated first time domain trace and an amplitude spectrum for each time window of the rotated second time domain trace; means for squaring each the amplitude spectrum to obtain a power spectrum for each the transformed rotated first time domain trace and for each the transformed rotated second time domain trace time domain trace; means for averaging the power spectrum for each the transformed rotated first time domain window across a common receiver gather; means for averaging the power spectrum for each the transformed rotated second time domain window across a common receiver gather; means for defining a third power spectrum representing a source wavelet, dependant upon the means for averaging; means for dividing the third power spectrum by the first power spectrum to obtain a set of first frequency domain scalars; means for dividing the third power spectrum by the second power spectrum to obtain a set of second frequency domain scalars; means for determine the amplitude spectrum of the rotated first and second traces, wherein an first amplitude spectrum results, a second amplitude spectrum results, an first phase spectrum results, and a second phase spectrum results; means for multiplying the first amplitude spectrum by the set of first frequency domain scalars; means for multiplying the second amplitude spectrum by the set of second frequency domain scalars; means for inverse transforming the first amplitude spectrum multiplied by the set of first frequency domain scalars using the first phase spectrum; means for inverse transforming the second amplitude power spectrum multiplied by the set of second frequency domain scalars using the second phase spectrum; means for comparing amplitudes of the inverse transformed first amplitude spectra multiplied by the set of first frequency domain scalars to derive an first amplitude scalar; means for comparing amplitudes of the inverse transformed second amplitude spectra multiplied by the set of second frequency domain scalars to derive a second amplitude scalar; means for matching the amplitude of the entire trace to a predetermined constant with the first amplitude scalar to obtain an amplitude and wavelet matched trace; means for matching the amplitude of the entire trace to a predetermined constant with the second amplitude scalar to obtain an amplitude and wavelet matched trace; and means for re-rotating the traces to a desired orientation.

In one even more specific embodiment, the means for re-rotating includes: means for returning the traces to original orientation; and means for determining wavelet matched traces by inverse transformation.

In another more specific embodiment, the means for rotating includes: means for returning the traces to original orientation; and means for determining wavelet matched traces by deconvolution.

According to still another aspect of the invention, a system is provided for processing multicomponent seismic data, wherein the data comprises traces from a first component and a second component, wherein there is a source location and a receiver location associated with each trace, the method comprising: means for determining an angle between one of the axes of either the first component or the second component; means for assigning a ratio value to an amplitude relationship between the first and the second components, the value being dependant upon the angle; means for determining an actual ratio of the amplitudes of the first component and the second component; means for deriving at least one scalar dependant upon the value and the actual ratio such that multiplication of the at least one scalar and at least one of the traces of first component and the second component causes the ratio of the multiplied trace amplitude and the amplitude of the trace from the other component to match the value; and means for multiplying the at least one scalar to at least one of the traces of the first component and the second component.

According to a more specific embodiment, the system further comprises means for rotating the traces.

According to still another aspect of the invention, a system is provided for processing multicomponent seismic data, wherein the data comprises traces from a first component and a second component, wherein there is a source location and a receiver location associated with each trace, the system comprising: means for rotating the traces to a predetermined angle between one of the axes of either the first component or the second component; means forassigning a ratio value to an amplitude relationship between the first and the second components, the value being dependant upon the angle; means for determining an actual ratio of the amplitudes of the first component and the second component; means for deriving at least one scalar dependant upon the value and the actual ratio such that multiplication of the at least one scalar and at least one of the traces of first component and the second component causes the ratio of the multiplied trace amplitude and the amplitude of the trace from the other component to match the value; and means for multiplying the at least one scalar to at least one of the traces of the first component and the second component.

According to a more specific embodiment, the system further comprises: means for rotating the traces to a desired orientation after said multiplying.

BRIEF DESCRIPTION OF THE DRAWINGS

FIG. 14 is a block diagram of a system for effecting the method for correcting residual error of FIG. 13.

FIG. 15 is a flow chart of another method for correcting residual error on seismic data.

FIG. 16 is a block diagram of a system for effecting the method for correcting residual error of FIG. 15.

DESCRIPTION OF EXAMPLE EMBODIMENTS OF THE INVENTION

Figure 1:
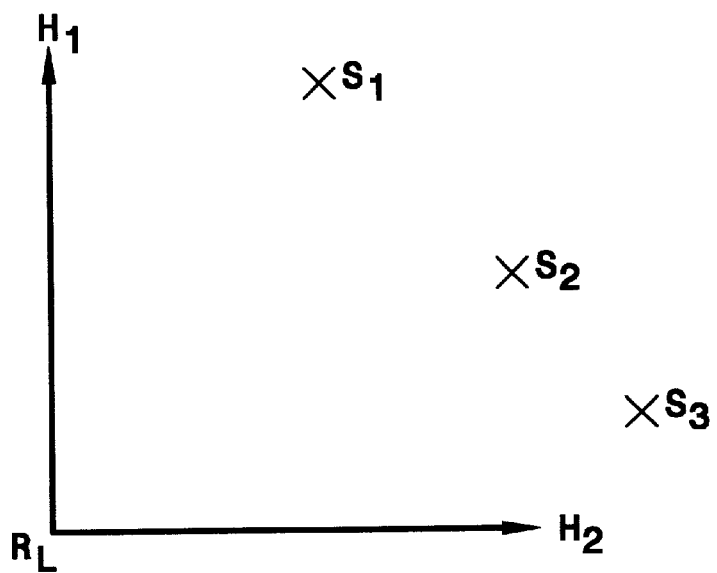
FIG. 1 shows that for a single receiver, with multiple shots $S_1$ through $S_3$ the is a variety of angles between the shot and the receiver location $R_L$.
Figure 2:
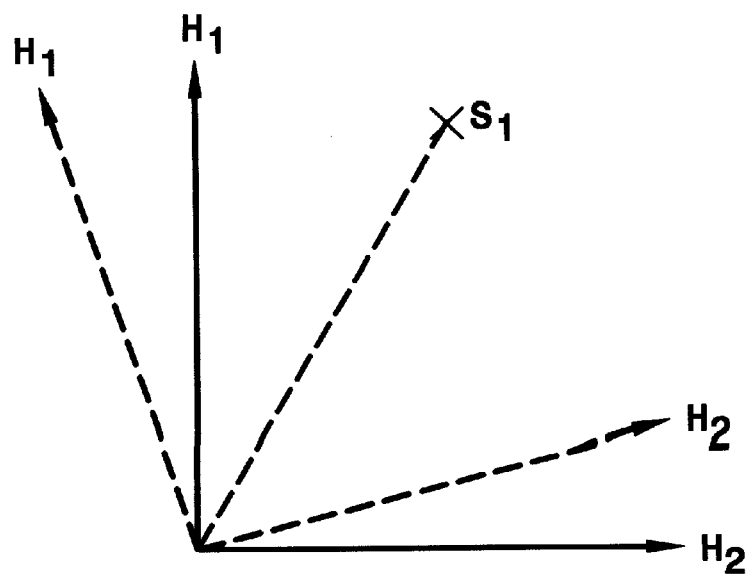
FIG. 2 is an illustration of the rotation for shot $S_1$.

In multicomponent phones, the in-line geophone $H_1$ and the cross-line geophone $H_2$ have different sensitivity. FIG. 1 shows that for a single receiver, with multiple shots $S_1$ through $S_3$ there are a variety of angles between the shot and the receiver location $R_L$. Therefore, according to one embodiment of the invention, for each shot, the plane of each receiver is mathematically rotated so that there is about forty-five degrees between the line from the shot point to the receiver location and the component or geophone axis. FIG. 2 is an illustration of the rotation for shot $S_1$. If the geophone components $H_1$ and $H_2$ were to function perfectly, and there were no errors (described below) there would be no sensitivity differences for rays incident at a forty-five degree angle between horizontal first and second geophones. In other words, the signal energy level, both in the time and the frequency domain, for $H_1$ and $H_2$, should be the same. Since nothing operates perfectly in the real world, however, the signals for $H_1$ and $H_2$ are rarely, if ever, the same. Therefore, according to one embodiment of the invention, the signals are simply made the same at 45 degrees. By matching the signals from the two geophones, various system errors, including sensitivity and coupling differences, are removed.

In this embodiment, the signals for geophones $H_1$ and $H_2$ are made the same both in the time domain and in the frequency domain. In one example time domain embodiment, the signals are made the same by trace equalization, through surface consistent scaling. In a frequency domain example embodiment, the signals are made equal by source signature shaping. In one specific, non-limiting example, this is done using trace-by-trace deconvolution. Many other methods of making the signals for geophones $H_1$ and $H_2$ the same are possible, as will occur to those of skill in the art.

After the signals are equalized, in some embodiments the planes of the receivers are re-rotated to their original orientation of the radial and transverse directions, or they are rotated to any other orientation of interest.

In still further embodiments, rather than being rotated to about 45 degrees, the signals from components $H_1$ and $H_2$ are rotated to another angle at which the amplitude relationship between the components is theoretically available. Forty-five degrees is merely the most simple, since there is a 1:1 theoretical relationship.

Figure 3:
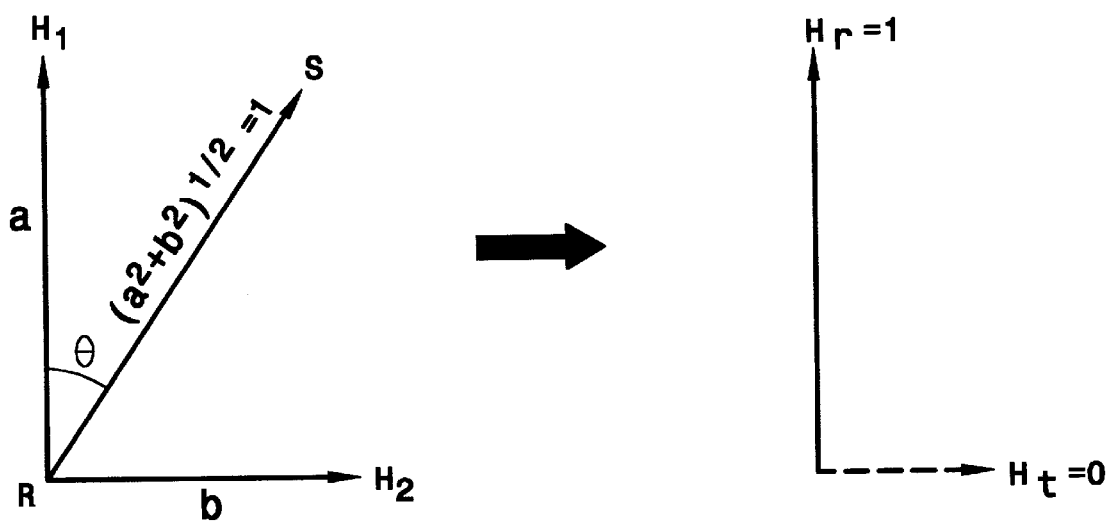
FIG. 3, a perfect situation is illustrated in which a rotation of $H_1$ to align with the source results in $H_1$ having all signal (illustrated as $H_r$) and $H_2$ has none (illustrated as $H_1$).
Figure 4:
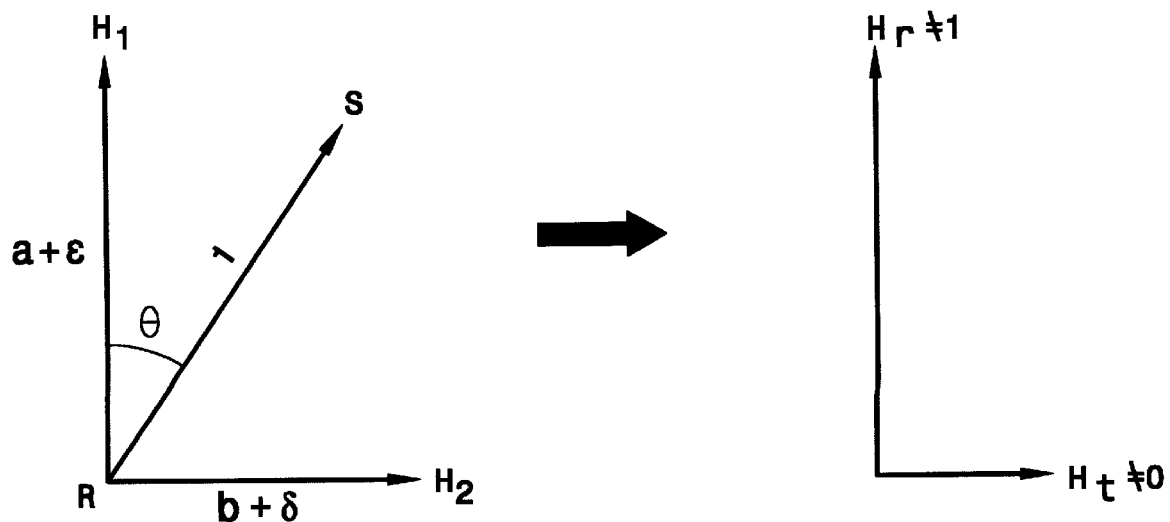
FIG. 4 is an illustration of signals in the real world as opposed to ideal signals.

Referring now to FIG. 3, by way of further illustration, a situation is seen in which a rotation of $H_1$ to align with the source results in $H_1$ having all signal (illustrated as $H_1$) and $H_2$ having none (illustrated as $H_2$). This is the theoretically perfect condition. FIG. 4, on the other hand, is an illustration of signals in the real world. These signals illustrate the effects of imperfect coupling, manufacturing variances or other problems or imperfections that produce less than ideal results.

Figure 5:
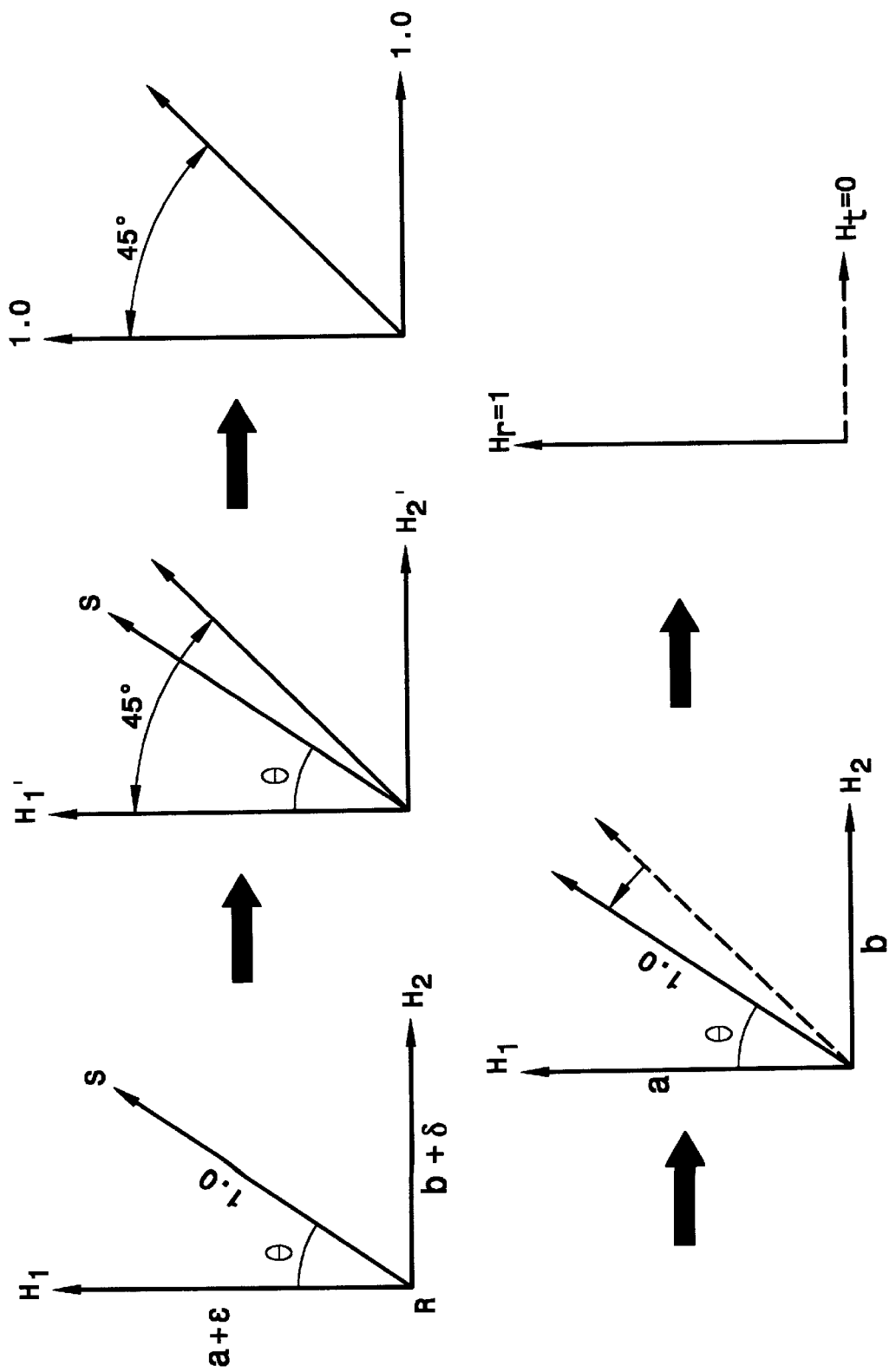
In FIG. 5, pre-conditioning is performed where the receiver is rotated forty-five degrees and the outputs are matched.

In FIG. 5, an embodiment of the invention is seen in which pre-conditioning is performed. Here, the receiver is rotated to about forty-five degrees and the outputs are matched. In this example, the rotation works to have $H_1$ rotate to a full or maximum signal and $H_2$ rotates to zero or to a minimum signal.

Figure 6:
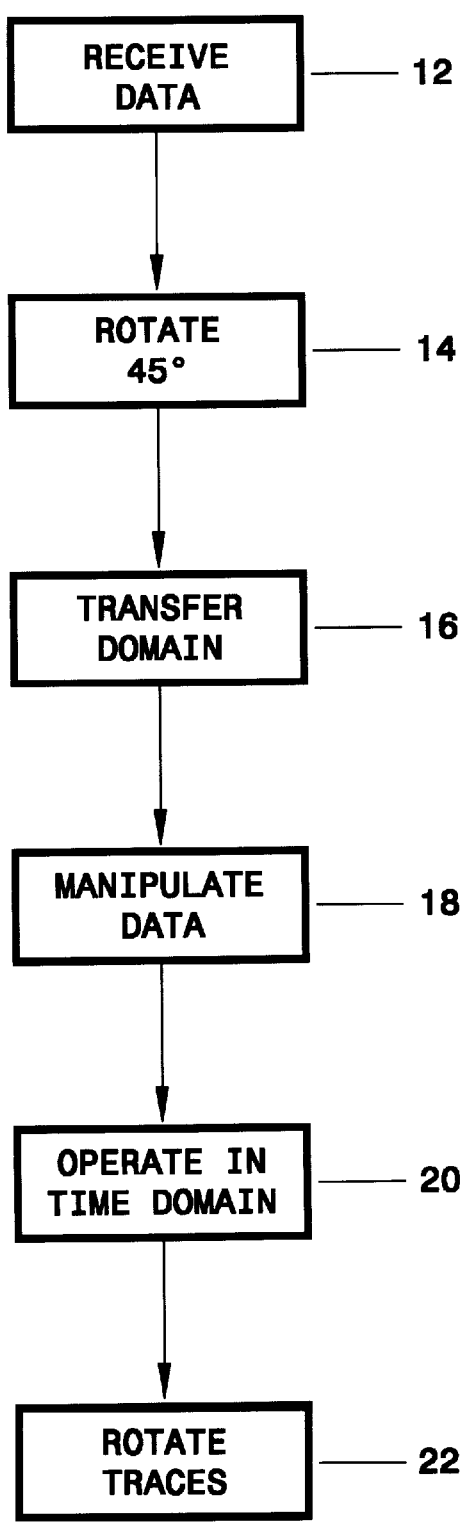
FIG. 6 is a block diagram of the flow chart of the method of the present invention.

FIG. 6 is a block diagram of the flow chart of an example method embodiment of the present invention. At block 12 data is received in any form currently in use in the art. At block 14, the received data is rotated to about forty-five degrees from a line between the source and receiver position. At block 16 the rotated data is transformed to another domain. In alternative embodiments, this domain is: frequency domain, f-k domain, $\tau$-P domain and Radon domain.

Figure 8:
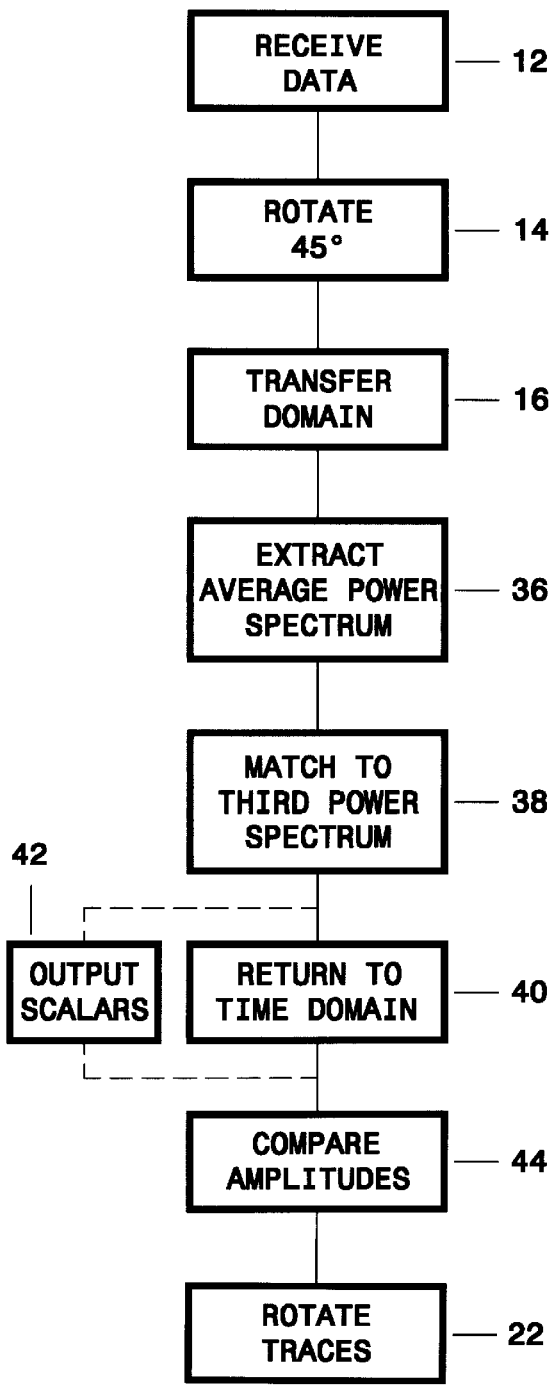
FIG. 8 is a block diagram of the expanded flow chart of the method of the present invention illustrated in FIG. 6.

The transformed data is then manipulated at block 18 (see FIG. 8). At block 20, the data undergoes an operation in the time domain. In some embodiments, the time-domain operation comprises inverse transforming the manipulated data or using scalars developed in block 18 to operate on the received data. At block 22 the traces are then rotated to any desired orientation, according to some embodiments of the invention.

Figure 7:
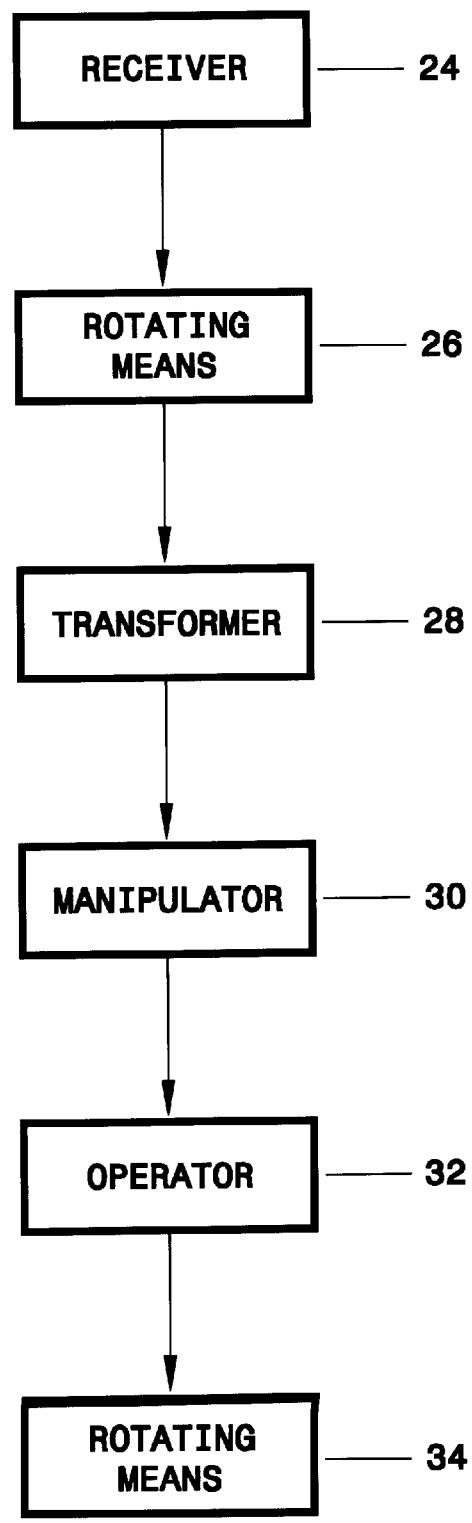
FIG. 7 is a block diagram of a system that may be used to perform the method depicted in the flow chart of FIG. 6.

FIG. 7 is a block diagram of a system embodiment of the invention, which may be used to perform the method depicted in the flow chart of FIG. 6. This system, in some embodiments, comprises a digital computer, or the like. Other system hardware/software combinations will occur to those of skill in the art. The only requirement is that the system be configurable to accomplish the aspects of the flow chart depicted in FIG. 6. Receiver 24 receives data in the form of computer tapes, radio waves, etc., that can be rotated by rotating means 26 to produce data in a different form. Transformer 28 changes the domain in which the data was received. Manipulator 30 processes the data to provide noise reduction or to develop scalars that can be used on the raw data. Operator 32 works on the data in the time domain. The actual operations are discussed further in conjunction with following figures. A rotating means 34 is used to rotate the data to any orientation desired.

FIG. 8 is a block diagram of the expanded flow chart of the method of the present invention illustrated in FIG. 6. Block 18, where the data is manipulated, is expanded to blocks 36 and 38, where the data which has been transformed to a different domain has an average power spectrum extracted at block 36 and matched to a third power spectrum at block 38, in one example embodiment.

Block 20 has been expanded to block 40, where the data is returned to the time domain, or in the alternative, to block 42 where scalars are developed and output to operate on the raw data. In either instance, block 44 has also been added where the amplitudes of the data are compared, which will be described in detail in conjunction with following figures.

Figure 9:
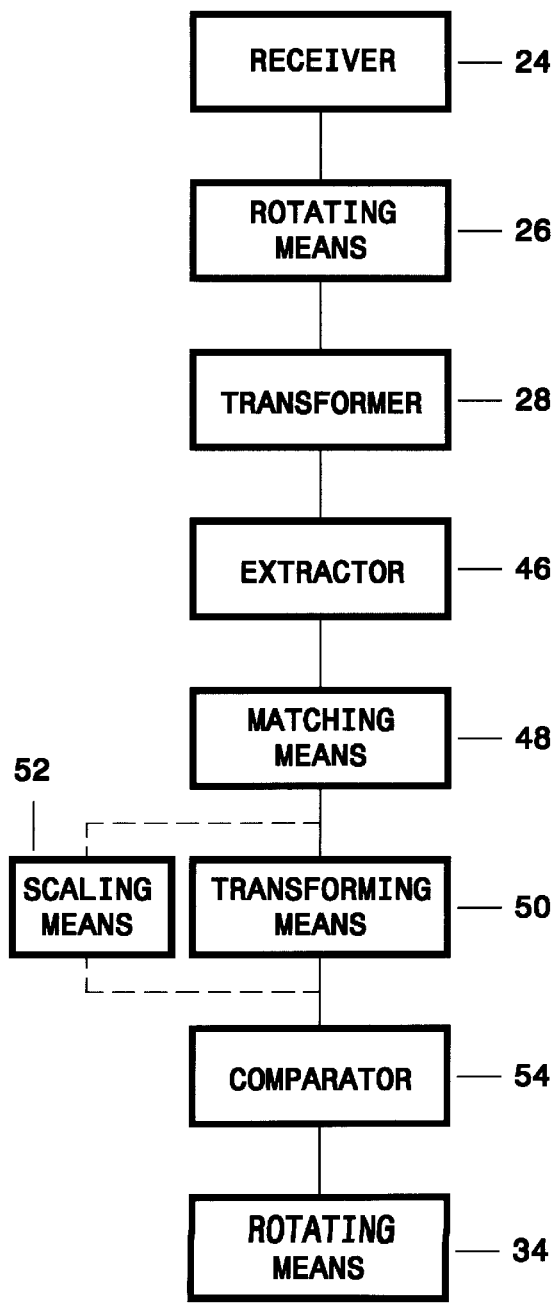
FIG. 9 is a block diagram of a system that may be used to perform the method depicted in the flow chart of FIG. 8.

FIG. 9 is a block diagram of another system embodiment of the invention that is used to perform the method depicted in the flow chart of FIG. 8. Manipulator 30 is expanded to extractor 46 and matching means 48, where the data which has been transformed to a different domain, has an average power spectrum extracted by extractor and matched to a third power spectrum at matching means 48 in the illustrated example.

Operator 32 has been expanded to inverse transforming means 50 where the data is returned to the time domain, or in the alternative, to scaling means 52 where scalars are developed and output to operate on the raw data. In either instance, comparator 54 has also been added where the amplitudes of the data are compared.

Figure 10:
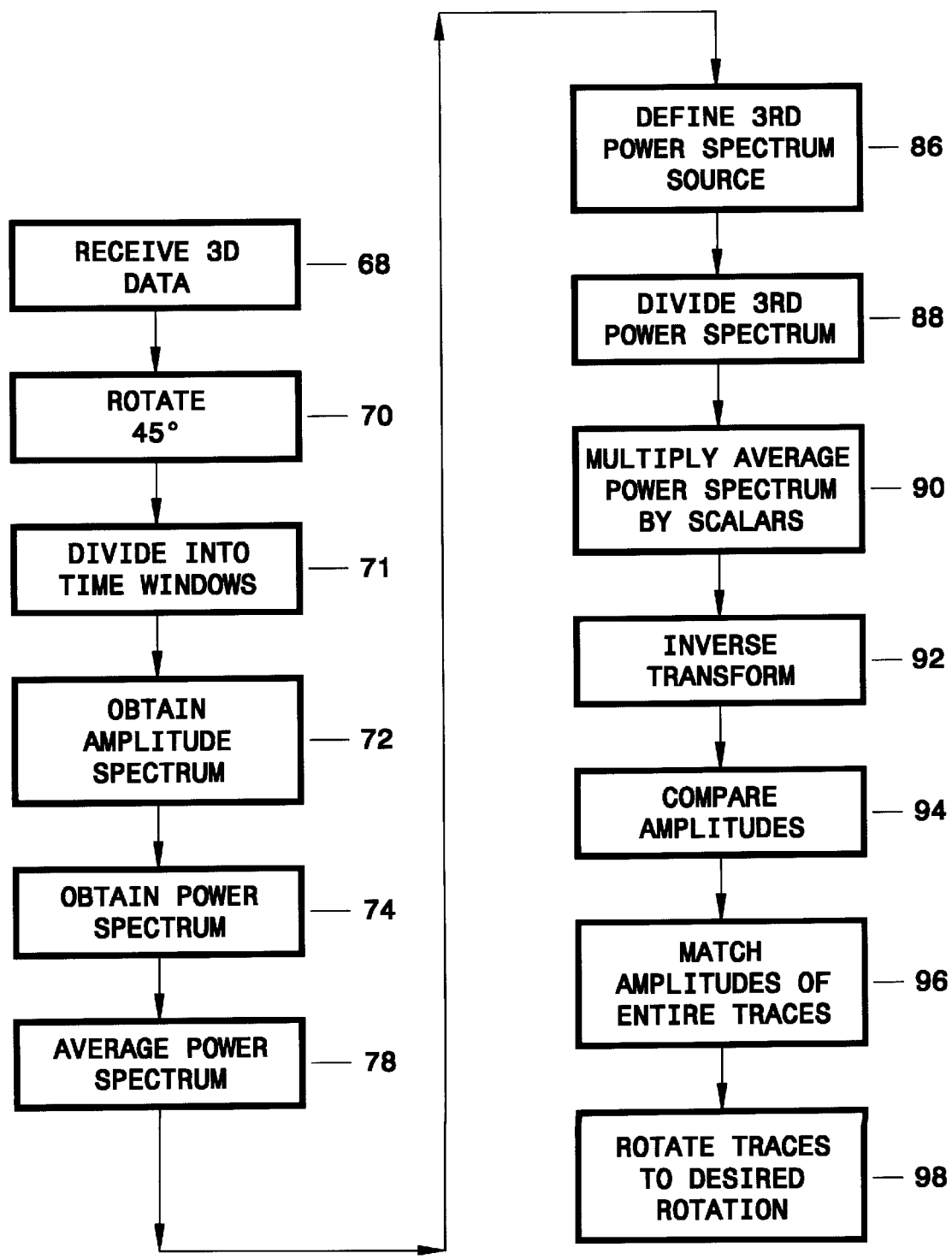
FIG. 10 is a block diagram of the flow chart of an alternate embodiment the method of the present invention.

FIG. 10 is a flow chart illustrating the process flow using an aspect of the present invention. In the case of high anisotropy, the direct arrival is used to control the rotation process. If there is low anisotropy, the entire trace or some smaller segment of the trace may be used to control rotation. In either case, FIG. 10 illustrates a method for processing first and second seismic traces. Seismic data is received at block 68. In block 70 the first and second seismic traces to about forty-five degrees in the time domain. This rotation may be done by any method currently in use in the art. Mathematical rotation of the seismic traces is performed according to one embodiment, by the method described in copending patent application Ser. No. 09/093,589, assigned to the same assignee as the present invention and incorporated herein by reference.

At block 71, the rotated traces are divided into windows.

At block 72, the rotated first and second time domain windows are transformed to the frequency domain to obtain an amplitude spectrum. This transformation is performed by any method currently in use in the art; however, the preferred embodiment uses fast fourier transform to translate the data in the time domain to data in the frequency domain. This is done to obtain an amplitude spectrum of the traces without any additional steps, such as normalization, autocorrelation, or crosscorrelation, to preserve the relative amplitude between the first traces and the second traces.

At block 74, each amplitude spectrum is squared to obtain a power spectrum.

At block 78 the power spectrum for each time domain window is averaged.

At block 86 a third power spectrum representing a source wavelet is defined. The method of defining the idealized source signature power spectrum is varied in alternative embodiments of the present invention. For example, the far field source signature method, commonly known in the art, is used in one embodiment, and its power spectrum is determined. In a second embodiment, the source signature is simply guessed and the power spectrum of that guess is used. In a third embodiment, the first and second source signatures are used to determine the slope of the power spectrum at the low cut frequency of the recording equipment, which is known. Source modeling and other types of human interpretation determines the upper frequency and an ideal wave shape is presumed.

At block 88 this third power spectrum is divided by the power spectrum to obtain a set of frequency domain scalars. This process is done for both the first power spectrum and for the second power spectrum. Thus, a set of frequency domain scalars is obtained for both the first traces and the second traces.

At block 90 the amplitude power spectrum is multiplied by the set of frequency domain scalars. At block 92 the amplitude power spectrum multiplied by the set of frequency domain scalars is inverse transformed. The inverse transformation is done using the phase spectrum of the input phase in some instances and using the phase spectrum of zero phase in other instances. The result is filtered first and second traces.

At block 94 the amplitudes of the inverse transformed amplitude power spectrum multiplied by the set of frequency domain scalars is compared to derive an amplitude scalar. This comparison may be done by any one of several methods known in the art, such as direct arrival comparison, root mean squared (RMS) comparison of a sample of or the entire trace, etc.

At block 96 the amplitude of the entire trace is matched with the amplitude scalar to a predetermined constant to obtain an amplitude and wavelet matched trace.

At block 98 the traces are rotated to a desired orientation. This may be the original orientation, transverse orientation, etc. In a first embodiment, the traces are rotated to the original orientation and use this orientation to go to the radial and transverse directions. In a second embodiment, the wavelet matched traces are determined by inverse transforming the first frequency scalars and the second frequency scalars. The second embodiment then provides and first filter operator and a second filter operator. Deconvolution is then performed on the traces using the respective operators to obtain wave matched traces.

Figure 11:
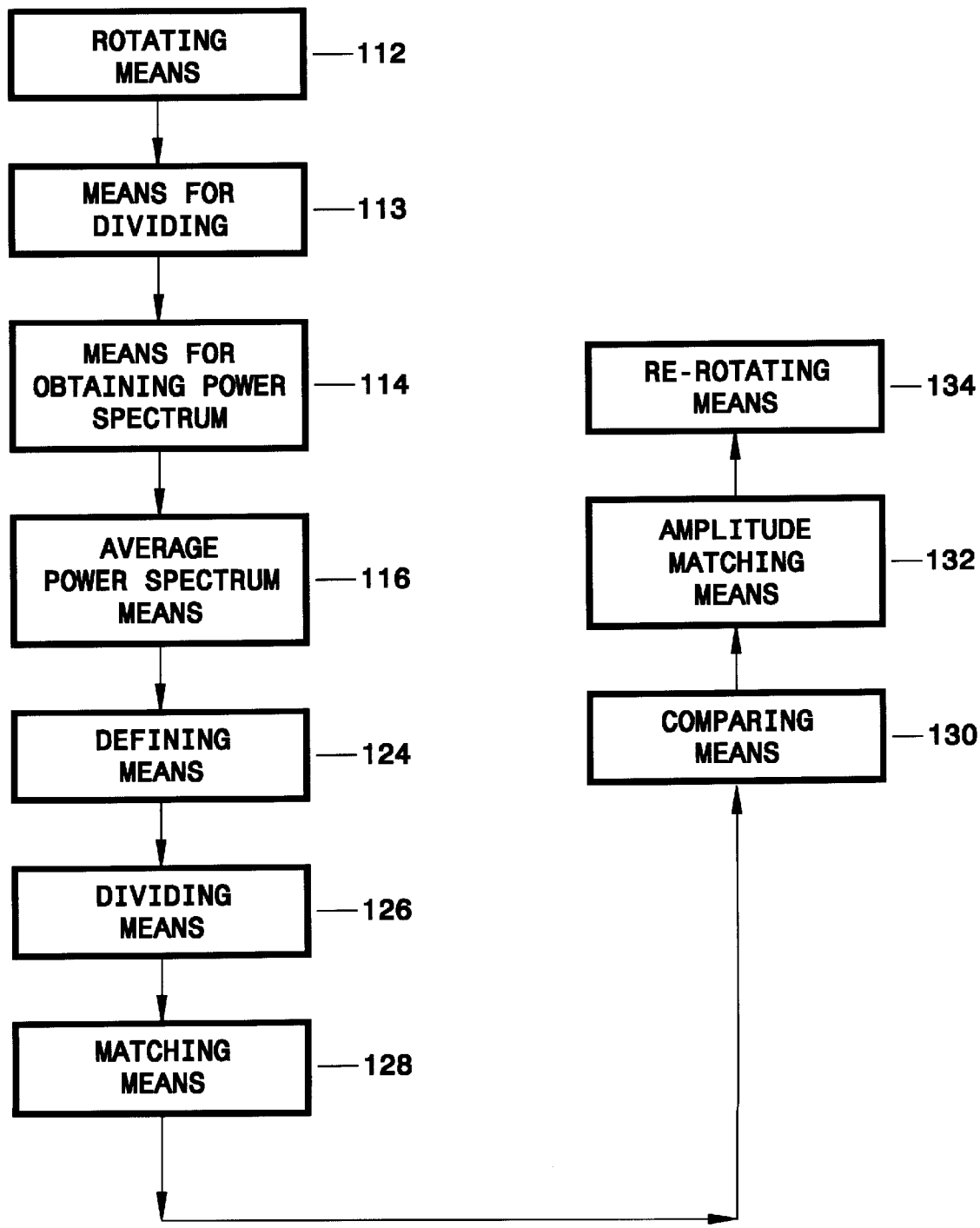
FIG. 11 is a block diagram of a system that may be used to perform the method depicted in the flow chart of FIG. 10.

Referring now to FIG. 11, a block diagram of a system to perform the method described in conjunction with FIG. 10. This system can take the form of a multipurpose digital computer or a dedicated work station for processing seismic data. The system for processing first and second seismic traces includes a means for rotating 112 the first and second seismic traces. The seismic traces are rotated to about a forty-five degree angle with imaginary lines connecting source locations with their respective receiver location. Dividing means 113 is for dividing each trace into time windows.

A power means 114 is used for obtaining a power spectrum for each trace. The desired power spectrum is obtained by power means 114 by transforming the rotated first and second time domain traces to the frequency domain to obtain an amplitude spectrum for each rotated time domain trace. This transformation may be done by Fourier transform or Fast Fourier Transform (fft) as is commonly done in the art. The amplitude spectrum for each trace is then squared to obtain a power spectrum.

Averaging means 116 is for averaging the power spectrum for each trace.

Power means 124 is for defining a power spectrum representing a source wavelet is also provided. This means may include a means for receiving an actual source wavelet measurement or generating a theoretical source wavelet.

Power dividing means 126 provides a means for dividing the third power spectrum by the power spectrum of the power spectrum obtained previously to obtain a set of frequency domain scalars.

Matching means 128 is for wavelet matching the first and the second traces is provided. Matching means 128, in providing a means for wavelet matching, may include a means for multiplying the amplitude power spectrum by the set of frequency domain scalars, a means for inverse transforming the amplitude power spectrum multiplied by the set of frequency domain scalars to obtain filtered traces and a means for correcting the polarity of the filtered traces.

Comparator 130 is for comparing amplitudes of the inverse transformed amplitude power spectrum multiplied by the set of frequency domain scalars. In providing a means for comparing, block 130 derives an amplitude scalar. Matching means 132 is a means for matching the amplitude of the entire trace to a predetermined constant with the amplitude scalar to obtain an amplitude and wavelet matched trace. Rotating means 134 provides a means for rotating the traces to a desired orientation. This orientation may be the original orientation or a transverse orientation or any orientation that may be needed to maximize the useful information obtained.

The present invention further provides a method, with alternate embodiments, and system, with concomitant alternate embodiments, for correcting the residual error in orientation determination and correction. Through the use of the present invention, residual error is eliminated despite its source, whether it is because of shot position errors, orientation errors or imperfect coupling errors.

Figure 12:
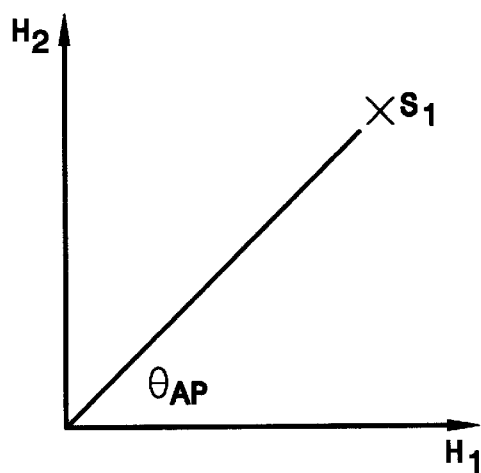
FIG. 12 is a graphical illustration of the relative locations of orthogonal horizontal components of a multicomponent geophone assembly and the location of a shot point source.

FIG. 12 is an idealized illustration of the relative location of orthogonal horizontal components of a multi-component seismic detector having horizontal components $H_1$ and $H_2$. Also illustrated is a shot point $S_1$. A line is drawn from shot point S to the intersection of the axis of $H_1$ and $H_2$, defining an angle $\Theta_{AP}$. For this system, where the shot point is at an angle $\Theta_{AP}$ from the axis $H_1$ of one of the horizontal components of a multicomponent geophone, a scalar K can be determined. In this case, $Amp_{H1}$=the amplitude of detector $H_1$, $Amp_{H2}$=the amplitude of detector H2' and $\Theta_{AP}=\Theta$ (what $\Theta$ is assumed from measurement or observation).

Therefore, $$\frac{Amp_{H1}}{Amp_{H2}} \text{Theoretical} = \frac{\cos\Theta}{\sin\Theta}$$

However, $$\frac{Amp_{H1}}{Amp_{H2}} \text{Actual} = K\frac{\cos\Theta}{\sin\Theta}$$

It is not known whether K is caused by coupling error, a poor estimate of $\Theta_{AP}$, or some other error. Further, rotation processes known to those of skill in the art will not work with these values of $Amp_{H1}$ and $Amp_{H2}$. To address this problem, the amplitude of one component, preferably the first component $Amp_{H1}$, is made the reference and the amplitude of the second component, $Amp_{H2}$, is scaled by K. After scaling, the amplitudes are rotated.

Figure 13:
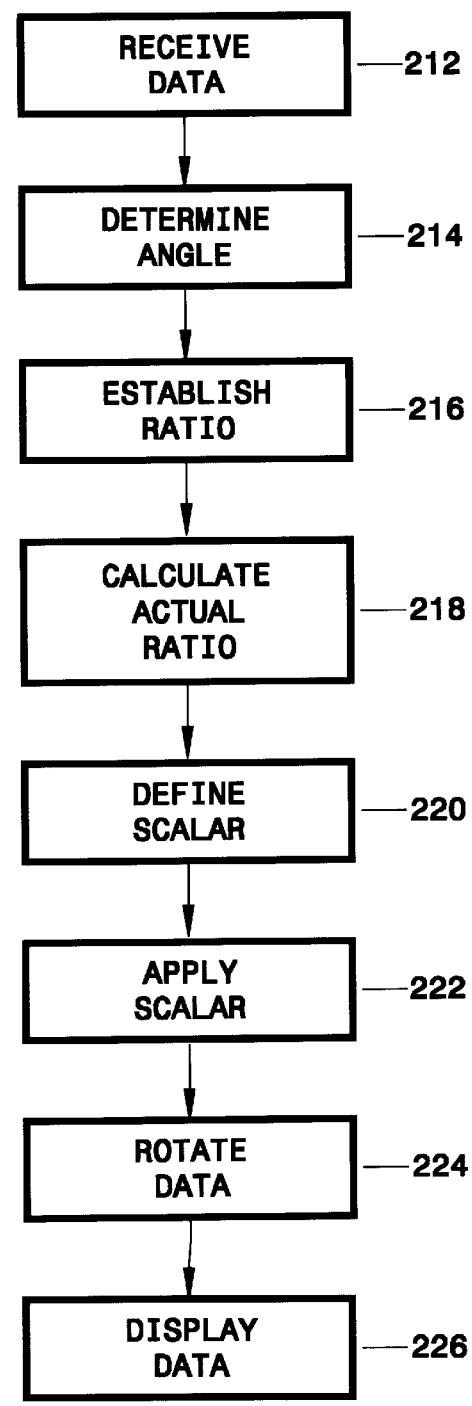
FIG. 13 is a flow chart of a method for correcting residual error in seismic data.

Referring now to FIG. 13, an additional embodiment of a method for orientation of multi-component seismic detectors is illustrated. Data is received at block 212. This data may be of a variety of types. In the preferred embodiment, RMS data is used; however, any type of data which may be identified as to the detector from which it is received may be used. In a first embodiment, the angle between the source and one of the horizontal components is determined at block 214. If the angle is, for example, forty-five degrees, then the ratio of amplitudes between orthogonal horizontal components should be one or unity. The ratio of the amplitudes of the two horizontal components is determined at block 216. This ratio may be determined in any one of many ways known to those skilled in the art. For example, the RMS value of any part of the trace, or the average absolute amplitudes, etc. may be used. Also, p-wave refracted up going waves and/or p-s energy, over any window will work.

The formula for the amplitude ratio at any angle $\Theta$ is derived from the following relationships:

$Amp_{H1}=A(\cos\Theta)$ $Amp_{H2}=A(\sin\Theta)$ where:
A=amplitude that a horizontal component would read at an angle of zero to the source.
Therefore, $$\frac{Amp_{H1}}{Amp_{H2}} = \frac{\cos\Theta}{\sin\Theta}$$

For any angle, the amplitude ratio is taken to be the ratio of the sine and cosine of the angle between the axis of one orthogonal horizontal detector and a line from the intersection of the axis of the two horizontal detectors and the source. To correct any error, the actual ratio is taken at block 218.

The radial and the transverse component energy with regard to the source is:

$R=Amp_{H1}(\cos\Theta)+Amp_{H2}(\sin\Theta)$ $T=Amp_{H1}(\cos\Theta)-Amp_{H2}(\sin\Theta)$ where:
R=radial energy
T=transverse energy A scalar is determined from the theoretical ratio of amplitudes and the actual ratio of the amplitudes at block 220. At block 222 the determined scalar is applied to the data. The signal from one horizontal component, preferably the first signal, is used as the reference. The signal from the other horizontal component, the second component, is scaled. The signals are then rotated at block 224. The rotation may be done by any process known in the art; however, the rotation method described in copending application Ser. No. 09/093,589, U.S. Pat. No. 6,061,298, incorporated herein by reference, is preferred. At block 226, the scaled rotated data may be displayed. The data may be displayed in any form currently in use in the art, such as computer printout, monitor image, etc.

Referring now to FIG. 14, a system for effecting the method of the embodiment of FIG. 13 of orientation of multi-component seismic detectors is illustrated. Receiver 252 receives seismic data, either as a radio signal, computer tapes, etc., as long as it is in a form that can be further processed. As stated previously, this data may be of a variety of types. In the preferred embodiment, however, RMS data is used. In this embodiment, determiner 254 determines the angle between the source and one of the horizontal components. Ratio means 256 calculates the theoretical ratio of the amplitudes of the two horizontal components. As stated in conjunction with the description of the method of FIG. 13, this ratio may be determined in any one of many ways known to those skilled in the art.

The formula for the amplitude ratio at any angle Θ is derived from the relationships described previously. For any angle, the amplitude ratio is taken to be the ratio of the sine and cosine of the angle between the axis of one orthogonal horizontal detector and a line from the intersection of the axis of the two horizontal detectors and the source. To correct any error, the actual ratio is taken by calculator 258.

A scalar is determined from the theoretical ratio of amplitudes and the actual ratio of the amplitudes by scalar means 260. Applying means 262 applies the determined scalar to the data. The signal from one horizontal component, preferably the first signal, is used as the reference. The signal from the other horizontal component, the second component, is scaled. Rotating means 264 then rotates the signals. The rotation may be done by any process known in the art; however, the rotation method described in copending application Ser. No. 09/093,589, U.S. Pat. No. 6,061,298, is preferred. Display 266 displays the scaled rotated data. Display 266 may take any form currently in use in the art, such as computer printout, CRT monitor, etc.

FIG. 15 is a flow chart of the method of an additional embodiment of the present invention. Data is received at block 312. As with the first embodiment, this data may be of a variety of types. In the preferred embodiment, RMS data is used; however, any type of data which may be identified as to the detector from which it is received may be used. In the second embodiment of the present invention, rotation is performed at block 314, before scaling. The rotation may be done by any process known in the art; however, the rotation method described in copending application Ser. No. 09/093, 589, U.S. Pat. No. 6,061,298, is preferred.

Scalars are developed at block 316. A different scaling technique is used in this embodiment. The source is assumed to be perpendicular to one component, producing an amplitude of a measurable value for one component and an amplitude of zero for the other component. If there is an error, the amplitude of the other component will not equal zero. Using the fact that the square root of the sum of the squares of the two amplitude components equals a given value provides the basis for developing two post rotation scalars, one for each component.

$$A = Amp_{H1actual}^2 + Amp_{H2actual}^2$$

using A to calculate two scalars for $Amp_{H1}$ and $Amp_{H2}$ $$S_1 = \frac{A}{Amp_{H1}}$$

$$S_2 = \frac{A}{Amp_{H2}}$$

These scalars are developed from the RMS values of the data, in one embodiment, within a window of the whole trace or a smaller window, which may be any window in the data.

The scalars are applied at block 318. Unlike the first embodiment, the scalars are applied to the amplitudes of both components. These scalars are developed from the RMS values of the data, in one embodiment, within a window of the whole trace or a smaller window, which may be any window in the data. Once the window is chosen, the scalar $S_1$ is applied on a sample by sample basis to all $Amp_{H1}$. Similarly, scalar $S_2$ is applied on a sample by sample basis to all $Amp_{H2}$. At block 320, the scaled rotated data may be displayed.

FIG. 16 is a block diagram of a system for effecting the method of a second embodiment of the present invention. Receiver 350 receives data. As with the previous embodiment, this data may be of a variety of types. In the preferred embodiment, RMS data is used; however, any type of data which may be identified as to the detector from which it is received may e used.

Rotating means 352 rotates the data. As stated previously, in the embodiment of the present invention described in FIG. 15, rotation is performed before scaling. The rotation may be done by any process known in the art; however, the rotation method described in copending application Ser. No. 09/093, 589, U.S. Pat. No. 6,061,298, is preferred.

Scalaring means 354 develops the scalars for the second embodiment. A scaling technique is used in the second embodiment that is different from the scaling technique of the first embodiment. The source is assumed to be perpendicular to one component, producing an amplitude of a measurable value for one component and an amplitude of zero for the other component. The actual process for developing the scalars is desrbibed in detail in conjunction with FIG. 15.

Applying means 356 applies the scalars to the rotated amplitude signals. Unlike the first embodiment, the scalars are applied to the amplitudes of both components. These scalars are developed from the RMS values of the data, in this embodiment, within a window of the whole trace or a smaller window. The chosen window may be any window in the data. Once the window is chosen, the scalar $S_1$ is applied on a sample by sample basis to all $Amp_{H1}$. Similarly, scalar $S_2$ is applied on a sample by sample basis to all $Amp_{H2}$.

Display means 358 may be of any type currently in use in the art, such as a printer for providing permanent printed seismograms or a monitor for providing a transient visual image or a monitor used with a cameras to provide select permanent records.

In a further embodiment of the present invention, the pre-rotation scalar K described in the first embodiment is applied. The data is rotated by conventional means. The scalars $S_1$ and $S_2$ described in the second embodiment are applied to all $Amp_{H1}$ and to all $Amp_{H2}$ on a sample by sample basis. Although this description may appear duplicative, it is included for clarity.

In this embodiment, as with the other embodiments, any amplitude calculation will work, not merely the RMS values.

Figure 17:
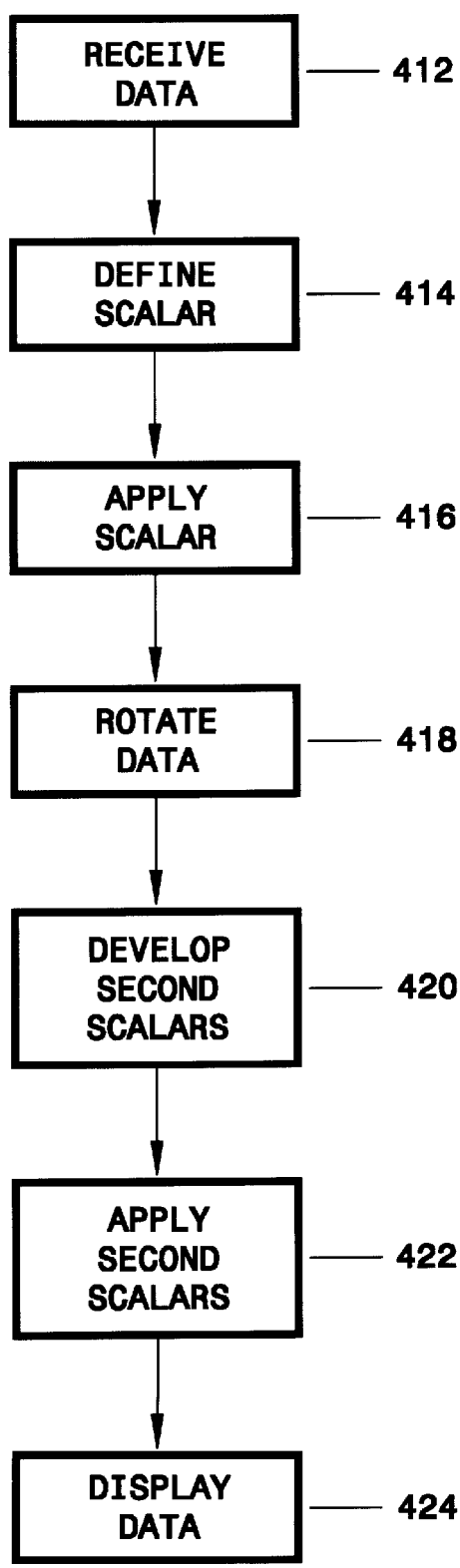
FIG. 17 is a flow chart of a third method for correcting residual error on seismic data.

Referring now to FIG. 17, a still further embodiment of method for orientation of multi-component seismic detectors is illustrated. Data is received at block 412. This data may be of a variety of types. In the preferred embodiment, RMS data is used; however, any type of data which may be identified as to the detector from which it is received may e used.

At block 414 the scalar is defined. In this step the angle between the source and one of the horizontal components is determined. If the angle is, for example, forty-five degrees, then the ratio of amplitudes between orthogonal horizontal components should be one or unity.

The ratio of the amplitudes of the two horizontal components is also determined at this step. This ratio may be determined in any one of many ways known to those skilled in the art. For example, the RMS value of any part of the trace, or the average absolute amplitudes, etc. may be used. Also, p-wave refracted up going waves and/or p-s energy, over any window will work.

The formula for the amplitude ratio at any angle $\Theta$ is derived from the following relationships:

$$Amp_{H1} = A(\cos \Theta)$$

$$Amp_{H2} = A(\sin \Theta)$$

where:
A=amplitude that a horizontal component would read at an angle of zero to the source.
Therefore, $$\frac{Amp_{H1}}{Amp_{H2}} = \frac{\cos \Theta}{\sin \Theta}$$

For any angle, the amplitude ratio is taken to be the ratio of the sine and cosine of the angle between the axis of one orthogonal horizontal detector and a line from the intersection of the axis of the two horizontal detectors and the source. To correct any error, the actual ratio is also taken at this step.

The radial and the transverse component energy with regard to the source is:

$$R = Amp_{H1}(\cos \Theta) + Amp_{H2}(\sin \Theta)$$

$$T = Amp_{H1}(\cos \Theta) - Amp_{H2}(\sin \Theta)$$

where:
R=radial energy
T=transverse energy

A scalar is determined from the theoretical ratio of amplitudes and the actual ratio of the amplitudes.

At block 416 the determined scalar is applied to the data. The signal from one horizontal component, preferably the first signal, is used as the reference. The signal from the other horizontal component, the second component, is scaled. The signals are then rotated at block 418. The rotation may be done by any process known in the art; however, the rotation method described in copending application Ser. No. 09/093,589, U.S. Pat. No. 6,061,298, is preferred.

Two different scalars are developed at block 420. A different scaling technique is used in this portion of the third embodiment. The source is assumed to be perpendicular to one component, producing an amplitude of a measurable value for one component and an amplitude of zero for the other component. If there is an error, the amplitude of the other component will not equal zero. Using the fact that the square root of the sum of the squares of the two amplitude components equals a given value provides the basis for developing two post rotation scalars, one for each component.

$$A = Amp_{H1actual}^2 + Amp_{H2actual}^2$$

using A to calculate two scalars for $Amp_{H1}$ and $Amp_{H2}$ $$S_1 = \frac{A}{Amp_{H1}}$$

$$S_2 = \frac{A}{Amp_{H2}}$$

These scalars are developed from the RMS values of the data, in one embodiment, within a window of the whole trace or a smaller window, which may be any window in the data.

The second set of scalars are applied at block 422. Unlike the first portion of this embodiment, the scalars are applied to the amplitudes of both components. These scalars are developed from the RMS values of the data, in one embodiment, within a window of the whole trace or a smaller window, which may be any window in the data. Once the window is chosen, the scalar $S_1$ is applied on a sample by sample basis to all $Amp_{H1}$. Similarly, scalar $S_2$ is applied on a sample by sample basis to all $Amp_{H2}$.

At block 424, the scaled rotated data may be displayed. The data may be displayed in any form currently in use in the art, such as computer printout, monitor image, etc.

Figure 18:
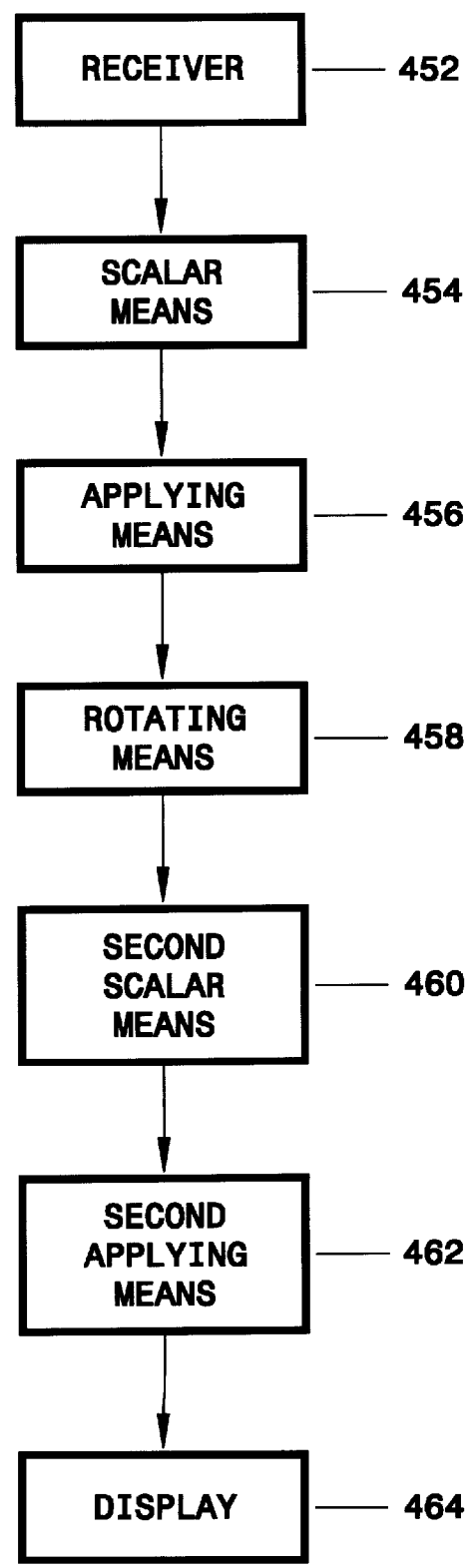
FIG. 18 is a block diagram of a system for effecting the method for correcting residual error of FIG. 17.

Referring now to FIG. 18, a system for effecting the method of the third embodiment of orientation of multi-component seismic detectors is illustrated. Receiver 452 receives seismic data, either as a radio signal, computer tapes, etc., as long as it is in a form that can be further processed. As stated previously, this data may be of a variety of types. In the preferred embodiment, however, RMS data is used.

Scalar means 454 develops the first scalar to be used in this embodiment. In this embodiment, scalar means 454 determines the angle between the source and one of the horizontal components. The theoretical ratio of the amplitudes of the two horizontal components is calculated. As stated in conjunction with the description of the method of FIG. 17, this ratio may be determined in any one of many ways known to those skilled in the art.

The formula for the amplitude ratio at any angle $\Theta$ is derived from the relationships described previously. For any angle, the amplitude ratio is taken to be the ratio of the sine and cosine of the angle between the axis of one orthogonal horizontal detector and a line from the intersection of the axis of the two horizontal detectors and the source. To correct any error, the actual ratio is calculated.

A scalar is determined from the theoretical ratio of amplitudes and the actual ratio of the amplitudes by scalar means 454.

Applying means 456 applies the determined scalar to the data. The signal from one horizontal component, preferably the first signal, is used as the reference. The signal from the other horizontal component, the second component, is scaled. Rotating means 458 then rotates the signals. The rotation may be done by any process known in the art; however, the rotation method described in copending application Ser. No. 09/093,589, U.S. Pat. No. 6,061,298, is preferred.

Scalar means 460 develops the scalars for the second portion of this embodiment. A scaling technique is used in the second portion that is different from the scaling technique of the first portion. The source is assumed to be perpendicular to one component, producing an amplitude of a measurable value for one component and an amplitude of zero for the other component. The actual process for developing the scalars is desrbibed in detail in conjunction with FIG. 15.

Applying means 462 applies the scalars to the rotated amplitude signals. Unlike the first portion, the scalars are applied to the amplitudes of both components. These scalars are developed from the RMS values of the data, in this portion, within a window of the whole trace or a smaller window. The chosen window may be any window in the data. Once the window is chosen, the scalar $S_1$ is applied on a sample by sample basis to all $Amp_{H1}$. Similarly, scalar $S_2$ is applied on a sample by sample basis to all $Amp_{H2}$.

Display means 464 may be of any type currently in use in the art, such as a printer for providing permanent printed seismograms or a monitor for providing a transient visual image or a monitor used with a cameras to provide select permanent records.

The preferred embodiment of the present invention for processing seismic data having first and second traces has been described. The method and system described includes rotating the first and the second traces to a forty-five degree angle with a line between a source and the receiver. The first and second traces are brought into the frequency domain by a Fourier transform to obtain an amplitude spectra. A power spectra for each trace is obtained and averaged to obtain a summed power spectra. A third power spectrum is defined and used through processing to obtain frequency domain scalars for both the first and second traces. The first and the second traces are wavelet matched. The amplitudes of the wavelet matched traces are compared to obtain an amplitude scalar. The amplitude scalar is used to match the first and second amplitude trace to a predetermined constant to obtain an amplitude and wavelet matched trace which may be rotated to a desired orientation.

While there has been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method for processing first and second seismic traces, each of said traces having a source location and a receiver location associated therewith, the method comprising:

rotating the first and second traces to about an a predetermined angle from a line between the source location and the receiver location associated with the traces;

manipulating the traces at about the pre-defined angle, wherein manipulated traces result; and rotating the manipulated traces to a desired orientation.

2. A method as in claim 1 wherein said manipulating comprises:

dividing the rotated first traces into time windows;

dividing the rotated second traces into time windows;

transforming said rotated and divided first time domain traces and said rotated and divided second time domain traces to the frequency domain to obtain an amplitude spectrum for each time window of said rotated first time domain trace and an amplitude spectrum for each time window of said rotated second time domain trace;

squaring each said amplitude spectrum to obtain a power spectrum for each said transformed rotated first time domain trace and for each said transformed rotated second time domain trace time domain trace;

averaging said power spectrum for each said transformed rotated first time domain window across a common receiver gather;

averaging said power spectrum for each said transformed rotated second time domain window across a common receiver gather;

defining a third power spectrum representing a source wavelet, dependant upon said averaging;

dividing said third power spectrum by said first power spectrum to obtain a set of first frequency domain scalars;

dividing said third power spectrum by said second power spectrum to obtain a set of second frequency domain scalars;

determining the amplitude spectrum of the rotated first and second traces, wherein an first amplitude spectrum results, a second amplitude spectrum results, an first phase spectrum results, and a second phase spectrum results;

multiplying said first amplitude spectrum by said set of first frequency domain scalars;

multiplying said second amplitude spectrum by said set of second frequency domain scalars;

inverse transforming said first amplitude spectrum multiplied by said set of first frequency domain scalars using the first phase spectrum;

inverse transforming said second amplitude power spectrum multiplied by said set of second frequency domain scalars using the second phase spectrum;

comparing amplitudes of said inverse transformed first amplitude spectra multiplied by said set of first frequency domain scalars to derive an first amplitude scalar;

comparing amplitudes of said inverse transformed second amplitude spectra multiplied by said set of second frequency domain scalars to derive a second amplitude scalar;

matching the amplitude of the entire trace to a predetermined constant with said first amplitude scalar to obtain an amplitude and wavelet matched trace;

matching the amplitude of the entire trace to a predetermined constant with said second amplitude scalar to obtain an amplitude and wavelet matched trace; and re-rotating said traces to a desired orientation.

3. The method according to claim 2 wherein said re-rotating step includes:

returning said traces to original orientation; and determining wavelet matched traces by inverse transformation.

4. The method according to claim 2 wherein said rotating step includes:

returning said traces to original orientation; and determining wavelet matched traces by deconvolution.

5. A method as in claim 1 wherein said manipulating comprises:

dividing each said trace into time windows;

obtaining a power spectrum for each window;

averaging said power spectrum for each said window;

obtaining a power spectrum for each said window for the entire of each said trace;

summing said power spectra of each said window of said trace for first traces to obtain a summed first power spectrum;

defining a third power spectrum representing a source wavelet;

dividing said third power spectrum by said power spectrum to obtain a set of frequency domain scalars;

wavelet shaping said first and said second traces;

comparing amplitudes of a inverse transformed amplitude power spectrum multiplied by said set of frequency domain scalars to derive an amplitude scalar;

matching the amplitude of the entire trace to a predetermined constant with said amplitude scalar to obtain an amplitude and wavelet matched trace; and rotating said traces to a desired orientation.

6. The method according to claim 5 wherein said obtaining a power spectrum for each trace includes:

transforming said rotated first and second time domain traces to the frequency domain to obtain an amplitude spectrum for each said rotated time domain trace;

squaring each said amplitude spectrum to obtain a power spectrum for each said trace;

setting the phase of each said transformed rotated time domain trace to zero.

7. The method according to claim 5 wherein said wavelet matching includes:

multiplying said amplitude power spectrum by said set of frequency domain scalars;

inverse transforming said amplitude power spectrum multiplied by said set of frequency domain scalars to obtain filtered traces; and correcting the polarity of said filtered traces.

8. A method as in claim 1 wherein said manipulating comprises:

transforming said first and said second traces into the frequency domain to obtain an amplitude spectra and a power spectra for each trace;

averaging said power spectra to obtain a summed power spectra;

defining a third power spectrum to obtain frequency domain scalars for both said first and said second traces;

wavelet said first and said second traces;

comparing amplitudes of said wavelet matched first and second traces to obtain an amplitude scalar;

using said amplitude scalar to match said first and said second amplitude trace to a predetermined constant to obtain an amplitude and wavelet matched trace; and rotating said amplitude and wavelet matched trace to a desired orientation.

9. The method according to claim 8 wherein said wavelet matching includes the steps of:

multiplying said amplitude spectra for each trace by their respective frequency domain scalars to obtain scalared traces;

inverse transforming said scalared traces to obtain filtered first and second traces; and correcting the polarity of said rotated traces.

10. A method as in claim 1 wherein the pre-determined angle is about forty-five degrees.

11. A method of processing multicomponent seismic data, wherein the data comprises traces from a first component and a second component, wherein there is a source location and a receiver location associated with each trace, the method comprising:

determining an angle between one of the axes of either the first component or the second component;

assigning a ratio value to an amplitude relationship between the first and the second components, the value being dependant upon the angle;

determining an actual ratio of the amplitudes of the first component and the second component;

deriving at least one scalar dependant upon the value and the actual ratio such that multiplication of the at least one scalar and at least one of the traces of first component and the second component causes the ratio of the multiplied trace amplitude and the amplitude of the trace from the other component to match the value; and multiplying the at least one scalar to at least one of the traces of the first component and the second component.

12. A method as in claim 11 further comprising rotating the traces.

13. A method of processing multicomponent seismic data, wherein the data comprises traces from a first component and a second component, wherein there is a source location and a receiver location associated with each trace, the method comprising:

rotating the traces to a predetermined angle between one of the axes of either the first component or the second component;

assigning a ratio value to an amplitude relationship between the first and the second components, the value being dependant upon the angle;

determining an actual ratio of the amplitudes of the first component and the second component;

deriving at least one scalar dependant upon the value and the actual ratio such that multiplication of the at least one scalar and at least one of the traces of first component and the second component causes the ratio of the multiplied trace amplitude and the amplitude of the trace from the other component to match the value; and multiplying the at least one scalar to at least one of the traces of the first component and the second component.

14. A method as in claim 13 further comprising rotating the traces to a desired orientation after said multiplying.

15. A system for processing first and second seismic traces, each of said traces having a source location and a receiver location associated therewith, the system comprising:

means for rotating the first and second traces to about forty-five degrees from a line between the source location and the receiver location associated with the traces;

means for manipulating the traces at about forty-five degrees, wherein manipulated traces result; and means for rotating the manipulated traces to a desired orientation.

16. A system as in claim 15 wherein said means for manipulating comprises:

means for dividing the rotated first traces into time windows;

means for dividing the rotated second traces into time windows;

means for transforming said rotated and divided first time domain traces and said rotated and divided second time domain traces to the frequency domain to obtain an amplitude spectrum for each time window of said rotated first time domain trace and an amplitude spectrum for each time window of said rotated second time domain trace;

means for squaring each said amplitude spectrum to obtain a power spectrum for each said transformed rotated first time domain trace and for each said transformed rotated second time domain trace time domain trace;

means for averaging said power spectrum for each said transformed rotated first time domain window across a common receiver gather;

means for averaging said power spectrum for each said transformed rotated second time domain window across a common receiver gather;

means for defining a third power spectrum representing a source wavelet, dependent upon said means for averaging;

means for dividing said third power spectrum by said first power spectrum to obtain a set of first frequency domain scalars;

means for dividing said third power spectrum by said second power spectrum to obtain a set of second frequency domain scalars;

means for determine the amplitude spectrum of the rotated first and second traces, wherein an first amplitude spectrum results, a second amplitude spectrum results, an first phase spectrum results, and a second phase spectrum results;

means for multiplying said first amplitude spectrum by said set of first frequency domain scalars;

means for multiplying said second amplitude spectrum by said set of second frequency domain scalars;

means for inverse transforming said first amplitude spectrum multiplied by said set of first frequency domain scalars using the first phase spectrum;

means for inverse transforming said second amplitude power spectrum multiplied by said set of second frequency domain scalars using the second phase spectrum;

means for comparing amplitudes of said inverse transformed first amplitude spectra multiplied by said set of first frequency domain scalars to derive an first amplitude scalar;

means for comparing amplitudes of said inverse transformed second amplitude spectra multiplied by said set of second frequency domain scalars to derive a second amplitude scalar;

means for matching the amplitude of the entire trace to a predetermined constant with said first amplitude scalar to obtain an amplitude and wavelet matched trace;

means for matching the amplitude of the entire trace to a predetermined constant with said second amplitude scalar to obtain an amplitude and wavelet matched trace; and means for re-rotating said traces to a desired orientation.

17. The system according to claim 16 wherein said means for re-rotating includes:

means for returning said traces to original orientation; and means for determining wavelet matched traces by inverse transformation.

18. The system according to claim 16 wherein said means for rotating includes:

means for returning said traces to original orientation; and means for determining wavelet matched traces by deconvolution.

19. A system as in claim 15 wherein said means for manipulating comprises:

means for dividing each said trace into time windows;

means for obtaining a power spectrum for each window;

means for averaging said power spectrum for each said window;

means for obtaining a power spectrum for each said window for the entire of each said trace;

means for summing said power spectra of each said window of said trace for first traces to obtain a summed first power spectrum;

means for defining a third power spectrum representing a source wavelet;

means for dividing said third power spectrum by said power spectrum to obtain a set of frequency domain scalars;

means for wavelet shaping said first and said second traces;

means for comparing amplitudes of a inverse transformed amplitude power spectrum multiplied by said set of frequency domain scalars to derive an amplitude scalar;

means for matching the amplitude of the entire trace to a predetermined constant with said amplitude scalar to obtain an amplitude and wavelet matched trace; and means for rotating said traces to a desired orientation.

20. The system according to claim 19 wherein said means for obtaining a power spectrum for each trace includes:

means for transforming said rotated first and second time domain traces to the frequency domain to obtain an amplitude spectrum for each said rotated time domain trace;

means for squaring each said amplitude spectrum to obtain a power spectrum for each said trace;

means for setting the phase of each said transformed rotated time domain trace to zero.

21. The system according to claim 19 wherein said wavelet matching includes:

means for multiplying said amplitude power spectrum by said set of frequency domain scalars;

means for inverse transforming said amplitude power spectrum multiplied by said set of frequency domain scalars to obtain filtered traces; and means for correcting the polarity of said filtered traces.

22. A system as in claim 15 wherein said means for manipulating comprises:

means for transforming said first and said second traces into the frequency domain to obtain an amplitude spectra and a power spectra for each trace;

means for averaging said power spectra to obtain a summed power spectra;

means for defining a third power spectrum to obtain frequency domain scalars for both said first and said second traces;

means for wavelet said first and said second traces;

means for comparing amplitudes of said wavelet matched first and second traces to obtain an amplitude scalar;

means for using said amplitude scalar to match said first and said second amplitude trace to a predetermined constant to obtain an amplitude and wavelet matched trace; and means for rotating said amplitude and wavelet matched trace to a desired orientation.

23. The system according to claim 22 wherein said means for wavelet matching includes the steps of:

means for multiplying said amplitude spectra for each trace by their respective frequency domain scalars to obtain scalared traces;

means for inverse transforming said scalared traces to obtain filtered first and second traces; and means for correcting the polarity of said rotated traces.

24. The system of claim 15 wherein said pre-determined angle comprises about 45 degrees.

25. A system of processing multicomponent seismic data, wherein the data comprises traces from a first component and a second component, wherein there is a source location and a receiver location associated with each trace, the system comprising:

means for determining an angle between one of the axes of either the first component or the second component;

means for assigning a ratio value to an amplitude relationship between the first and the second components, the value being dependant upon the angle;

means for determining an actual ratio of the amplitudes of the first component and the second component;

means for deriving at least one scalar dependant upon the value and the actual ratio such that multiplication of the at least one scalar and at least one of the traces of first component and the second component causes the ratio of the multiplied trace amplitude and the amplitude of the trace from the other component to match the value; and means for multiplying the at least one scalar to at least one of the traces of the first component and the second component.

26. A system as in claim 25 further comprising means for rotating the traces.

27. A system of processing multicomponent seismic data, wherein the data comprises traces from a first component and a second component, wherein there is a source location and a receiver location associated with each trace, the system comprising:

means for rotating the traces to a predetermined angle between one of the axes of either the first component or the second component;

means for assigning a ratio value to an amplitude relationship between the first and the second components, the value being dependant upon the angle;

means for determining an actual ratio of the amplitudes of the first component and the second component;

means for deriving at least one scalar dependent upon the value and the actual ratio such that multiplication of the at least one scalar and at least one of the traces of first component and the second component causes the ratio of the multiplied trace amplitude and the amplitude of the trace from the other component to match the value; and means for multiplying the at least one scalar to at least one of the traces of the first component and the second component.

28. A system as in claim 27 further comprising means for rotating the traces to a desired orientation after said multiplying.

* * * * *

UNITED STATES PATENT AND TRADEMARK OFFICE
CERTIFICATE OF CORRECTION

PATENT NO. : 6,182,015 B1
DATED : January 30, 2001
INVENTOR(S) : Altan et al.

It is certified that error appears in the above-identified patent and that said Letters Patent is hereby corrected as shown below:

Title page,
ABSTRACT, last line, replace "an" with -- a --.
After the word "scalar" on the last line, insert -- The amplitude of the entire trace is matched to a predetermined constant with the amplitude scalar to obtain an amplitude and wavelet matched trace. The traces are then re-rotated to a desired orientation. --

Column 2,
Line 1, before "transformed" delete -- the --.
Line 2, before "transformed" delete -- the --.
Line 2, delete "time domain trace ".
Line 3, after "each" delete -- the --.
Line 6, after "each" delete -- the --.
Line 13, replace "an" with -- a --.
Line 15, replace "an" with -- a --.
Line 28, replace "an" with -- a --.

Column 3,
Line 43, after "each" delete -- the --.
Line 44, after "each" delete -- the --.
Line 45, after "each" delete -- the --.
Line 46, delete "time domain trace".
Line 47, after "each" delete -- the --.
Line 50, after "each" delete -- the --.
Line 58, replace "determine" with -- determining --.
Line 59, replace "an" with -- a --.
Line 60, replace "an" with -- a --.

Column 4,
Line 6, replace "an" with -- a --.
Line 55, replace "forassigning" with -- for assigning --.
Line 62, after "traces of" insert -- the --.

Column 5,
Line 8, after "$S_3$" replace "the" with -- there --.
Line 11, before "Fig. 3" insert -- In --.
Line 13, after "illustrated as" replace "$H_i$" with -- $H_t$ --.
Line 29, after "embodiment" insert -- of --.

UNITED STATES PATENT AND TRADEMARK OFFICE
CERTIFICATE OF CORRECTION

PATENT NO. : 6,182,015 B1
DATED : January 30, 2001
INVENTOR(S) : Altan et al.

Page 2 of 3

It is certified that error appears in the above-identified patent and that said Letters Patent is hereby corrected as shown below:

Column 6,
Line 32, after "illustrated as" replace "$H_2$" with -- $H_t$ --.
Line 51, replace """ with -- $\tau$ --.

Column 7,
Line 44, after "seismic traces" insert -- are rotated --.
Line 58, after "uses" insert -- a --.

Column 8,
Line 47, replace "and" with -- a --.

Column 9,
Line 7, delete "is".
Line 17, delete "is".
Line 57, replace "$H_1$" with -- $H_1'$ --.
Line 58, after "H2" insert -- , --.

Column 12,
Line 28, replace "e" with -- be --.
Line 35, replace "scalaring" with -- scalar --.
Line 42, replace "desrbibed" with -- described --.
Line 56, replace "cameras" with -- camera --.

Column 13,
Line 6, replace "e" with -- be --.

Column 15,
Line 6, replace "desrbibed" with -- described --.
Line 20, replace "cameras" with -- camera --.
Line 49, delete "an".

Column 16,
Line 2, delete "time domain trace".
Line 18, replace "an" with -- a --.
Line 35, replace "an" with -- a --.

Column 17,
Line 6, replace "a" with -- an --.
Line 42, after "wavelet" insert -- matching --.

UNITED STATES PATENT AND TRADEMARK OFFICE
CERTIFICATE OF CORRECTION

PATENT NO. : 6,182,015 B1
DATED : January 30, 2001
INVENTOR(S) : Altan et al.

It is certified that error appears in the above-identified patent and that said Letters Patent is hereby corrected as shown below:

Column 19,
Line 4, delete "time domain trace".
Line 22, replace "determine" with -- determining --.
Line 23, replace "an" with -- a --.
Line 25, replace "an" with -- a --.
Line 41, replace "an" with -- a --.

Column 20,
Line 17, replace "a" with -- an --.
Line 54, after "wavelet" insert -- matching --.

Signed and Sealed this

Twentieth Day of November, 2001

Attest:

*Nicholas P. Godici*

NICHOLAS P. GODICI
*Attesting Officer*     *Acting Director of the United States Patent and Trademark Office*